(12) United States Patent
Satyaseelan et al.

(10) Patent No.: US 10,948,062 B2
(45) Date of Patent: Mar. 16, 2021

(54) TORQUE CONVERTER FOR MODULAR HYBRID TRANSMISSION INCLUDING COAST ENGAGEMENT STRUCTURE

(71) Applicant: Schaeffler Technologies AG & Co. KG, Herzogenaurach (DE)

(72) Inventors: Ayyalraju Satyaseelan, Wooster, OH (US); John Ramsey, Mansfield, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 15/801,845

(22) Filed: Nov. 2, 2017

(65) Prior Publication Data

US 2019/0128394 A1 May 2, 2019

(51) Int. Cl.
*F16H 45/02* (2006.01)
*F16H 41/04* (2006.01)
*F16H 41/28* (2006.01)
*B60K 6/387* (2007.10)
*B60K 6/48* (2007.10)

(52) U.S. Cl.
CPC .............. *F16H 45/02* (2013.01); *B60K 6/387* (2013.01); *F16H 41/04* (2013.01); *F16H 41/28* (2013.01); *B60Y 2200/92* (2013.01); *B60Y 2400/426* (2013.01); *Y10S 903/914* (2013.01)

(58) Field of Classification Search
CPC .......... F16H 45/02; F16H 41/04; F16H 41/28; B60Y 2200/92; B60Y 2400/426; Y10S 903/914
See application file for complete search history.

(56) References Cited

U.S. PATENT DOCUMENTS

| | | | |
|---|---|---|---|
| 7,234,577 B2* | 6/2007 | Masuya | F16H 45/02 192/3.29 |
| 7,264,101 B2* | 9/2007 | Hauck | F16D 25/0638 192/113.36 |
| 9,303,747 B2* | 4/2016 | Mototsune | F16H 45/02 |
| 9,523,420 B2* | 12/2016 | Depraete | F16H 45/02 |
| 9,709,145 B2* | 7/2017 | Depraete | F16H 45/02 |
| 9,845,855 B2* | 12/2017 | Depraete | F16H 45/02 |
| 2013/0230385 A1* | 9/2013 | Lindemann | F16D 33/18 415/122.1 |
| 2014/0097055 A1 | 4/2014 | Lindemann et al. | |
| 2015/0152951 A1* | 6/2015 | Rentfrow | F16H 45/02 192/3.29 |
| 2015/0175154 A1 | 6/2015 | Frait et al. | |
| 2016/0109010 A1* | 4/2016 | Lindemann | B23P 15/00 192/3.21 |
| 2016/0116041 A1* | 4/2016 | Depraete | F16H 45/02 192/3.29 |
| 2017/0314662 A1 | 11/2017 | Nelson et al. | |
| 2018/0003279 A1* | 1/2018 | Avins | F16H 45/02 |
| 2018/0112756 A1* | 4/2018 | Adari | F16C 17/04 |

* cited by examiner

*Primary Examiner* — Tinh Dang
(74) *Attorney, Agent, or Firm* — Davidson, Davidson & Kappel, LLC

(57) ABSTRACT

A torque converter includes a cover, an impeller including an impeller engagement section, an axially movable turbine piston including a turbine engagement section configured for engaging the impeller engagement section to form a lockup clutch and a coast engagement structure configured for contacting the cover to limit axial movement of the turbine piston away from the impeller in a coast condition.

15 Claims, 3 Drawing Sheets

TORQUE CONVERTER FOR MODULAR HYBRID TRANSMISSION INCLUDING COAST ENGAGEMENT STRUCTURE

The present disclosure relates generally to torque converter and more specifically to a torque converter for a modular hybrid transmission.

BACKGROUND

U.S. Publication No. 2014/0097055 discloses a torque converter with a turbine piston, which is an axially movable turbine used as a piston of a lockup clutch. U.S. Publication No. 2017/0314662 discloses a damper assembly arrangement that limits clutch liftoff during coast conditions. U.S. Publication No. 2015/0175154 discloses a modular hybrid transmission with a torque converter.

SUMMARY OF THE INVENTION

A torque converter is provided. The torque converter includes a cover, an impeller including an impeller engagement section, an axially movable turbine piston including a turbine engagement section configured for engaging the impeller engagement section to form a lockup clutch and a coast engagement structure configured for contacting the cover to limit axial movement of the turbine piston away from the impeller in a coast condition.

According to embodiments of the torque converter of the present disclosure, the coast engagement structure may contact a non-ballooning portion of the front cover. The coast engagement structure may be a spring plate. The cover may include a front cover and a rear cover forming a shell of the impeller. The spring plate may contact a radially extending section of the front cover. The spring plate may be fixed to the radially extending section of the front cover by a plurality of fasteners. The torque converter may include a flange fixed to the turbine piston, a hub configured for transferring torque to a transmission input shaft and a bushing provided on the hub. The flange may be non-rotatably fixed to the hub. A radially inner end of the coast engagement structure may be supported on the hub via the bushing. The bushing may be axially forced against the flange by the coast engagement structure during the coast condition. The coast engagement structure may contact an axially extending section of the cover. The turbine piston may include a turbine shell supporting a plurality of turbine blades. The turbine shell may include an outer radial extension radially outside of the turbine blades. The outer radial extension may forming the engagement section of the turbine piston. The coast engagement structure may be arranged for contacting the outer radial extension during the coast condition. The coast engagement structure may be a ring assembly axially aligned with an outermost circumferential surface of the turbine piston.

A hybrid module is also provided. The hybrid module includes the torque converter and electric motor fixed to the cover by a plurality of circumferentially spaced fasteners. The electric motor may include a rotor and a rotor carrier supporting the rotor. The rotor carrier may include an axially extending section supporting and inner circumferential surface of the rotor and a radially extending section extending radially outward from the axially extending section. The fasteners may be fixed to the radially extending section, the coast engagement structure being fixed to the cover radially inside of the fasteners.

A method of constructing a torque converter is also provided. The method includes providing a cover, an impeller including an impeller engagement section and an axially movable turbine piston including a turbine engagement section configured for engaging the impeller engagement section to form a lockup clutch; and arranging a coast engagement structure in contact with the cover to limit axial movement of the turbine piston away from the impeller in a coast condition.

According to embodiments of the torque converter of the present disclosure, the coast engagement structure may be arranged in contact with a non-ballooning portion of the front cover. The coast engagement structure may be a spring plate. The cover may include a front cover and a rear cover forming a shell of the impeller. The spring plate may contact a radially extending section of the front cover. The arranging of the coast engagement structure may include fixing the spring plate to the radially extending section of the front cover by a plurality of fasteners. The coast engagement structure may contact an axially extending section of the cover. The turbine piston may include a turbine shell supporting a plurality of turbine blades. The turbine shell may include an outer radial extension radially outside of the turbine blades. The outer radial extension may form the engagement section of the turbine piston. The coast engagement structure may be arranged for contacting the outer radial extension during the coast condition. The coast engagement structure may be a ring assembly. The arranging the coast engagement structure may include axially aligning the ring assembly with an outermost circumferential surface of the turbine piston.

BRIEF DESCRIPTION OF THE DRAWINGS

The present disclosure is described below by reference to the following drawings, in which:

FIG. 3b shows a sectional view of the ring assembly along A-A in FIG. 3a.

DETAILED DESCRIPTION

The present disclosure provides a torque converter for a hybrid module, for use in a modular hybrid transmission. The torque converter does not include a damper assembly, but instead includes a coast engagement structure that limits a turbine piston from moving away from an impeller during a coast condition, in which the turbine piston is rotating at a greater angular velocity than the impeller and torque converter cover. A clutch gap, which is formed between an engagement section of the turbine piston and an engagement section of the impeller during liftoff, is limited by the coast engagement structure. Some torque converter designs have trouble engaging in coast conditions. This is partially due to the turbine piston moving too far away from the impeller due to ballooning. Because the turbine piston thrust path gets larger and the turbine piston wants to move away from the impeller in coast, the clutch gap is too large and difficult to close. The hybrid module may advantageously be used in a transmission that includes an engine damper upstream of the hybrid module in a system configured to allow the torque converter clutch to slip via hydraulic controls.

In one embodiment, a spring plate is mounted to a non-ballooning portion of the torque converter cover to support the turbine under thrust conditions and keep the clutch gap small. To add additional controllability, the spring plate may bias the lockup clutch closed. In another embodiment, a centering sleeve is provided for contacting the front cover and a segmented spring is provided for contacting an engagement section of the turbine piston to limit movement of the turbine piston away from the impeller.

Figure 1:
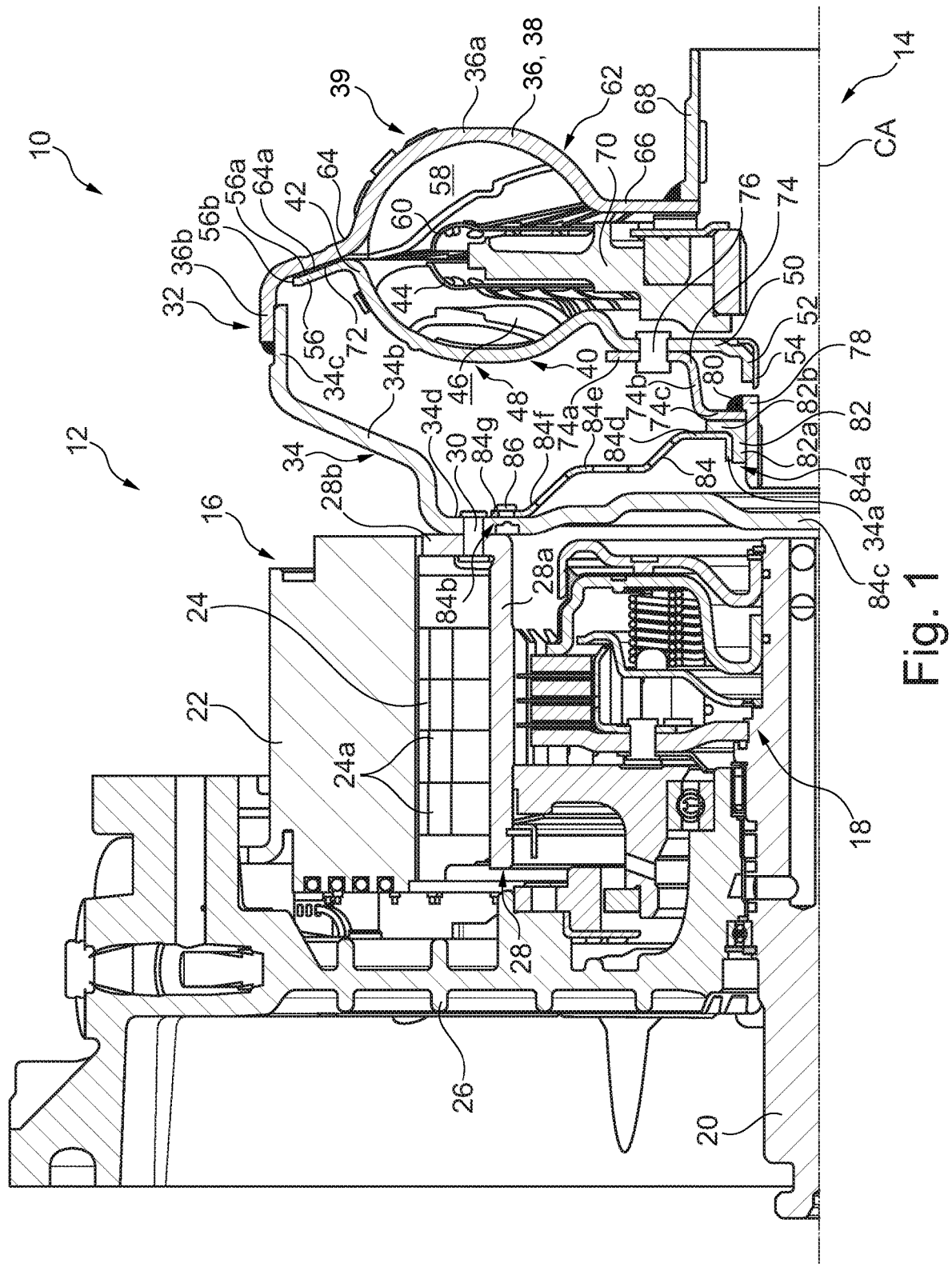
FIG. 1 shows a hybrid module in accordance with an embodiment of the present disclosure.

FIG. 1 shows hybrid module 10 in accordance with an embodiment of the present disclosure. Module 10 includes a hybrid drive unit 12 configured for attachment to an internal combustion engine and a torque converter 14 configured for attachment to a transmission input shaft. In a known manner, hybrid drive unit 12 is selectively operable to transmit torque from the internal combustion engine to torque converter 14 or directly drive torque converter 14 via an electric motor 16 of drive unit 12. Along these lines, hybrid drive unit 12 includes an engine connect/disconnect clutch 18 for selectively connecting torque converter 14 to an input shaft 20, which is configured for non-rotatably connecting for example via a flywheel to a crankshaft of the internal combustion engine, or disconnecting torque converter 14 from input shaft 20 such that torque converter can be driven solely by electric motor 16.

Electric motor 16 includes a stator 22 and a rotor 24, with stator 22 being fixed to a housing 26 of hybrid drive unit 12. Upon current being provided to coils of stator 22, rotor 24 is rotated about a center axis CA of hybrid module 10 in a known manner, due to rotor 24 including a plurality of permanent magnet segments 24a that are energized by the current in the coils. The terms axially, radially and circumferentially as used herein are used with respect to center axis CA. Magnet segments 24a are supported at their inner circumferences by a rotor carrier 28. Rotor carrier 28 includes a cylindrical axially extending section 28a supporting the inner circumferences of magnet segments 24a and a radially extending section 28b protruding radially outward from an end of axially extending section 28a. Torque converter 14 is fixed to hybrid drive unit 12 at radially extending section 28b of rotor carrier 28 by a plurality of fasteners 30 passing through a cover 32 of torque converter 14.

Torque converter 14 includes a front cover 34 and a rear cover 36 together forming cover 32, with fasteners 30 passing through front cover 34. Front cover 34 is includes a radially extending section 34a intersecting center axis CA, a tapered section 34b radially outward from a radially outer end of radially extending section 34a while extending axially away from hybrid drive 12 and an axially extending section 34c, which forms an outermost circumferential surface of front cover 34, extending axially from a radially outer end of tapered section 34b. Rear cover 36 includes a radially extending section 36a that forms impeller shell 38 of an impeller 39 and an annular axially extending section 36b that protrudes axially at an outer circumference of radially extending section 36a and is welded to axially extending section 34c of front cover 34.

Torque converter 14 also includes a turbine 40 configured to define a piston that is axially moveable toward and away from impeller shell 38 such that an engagement section of turbine 40 engages an engagement section of impeller shell 38 so as to form a lockup clutch. Turbine 40 includes a turbine shell 42 and a core ring 44 supporting a plurality of turbine blades 46 therebetween. Turbine shell 42 includes a rounded blade supporting portion 48, which is shaped as an annular bowl, for contacting engine side edges of turbine blades 46. Radially inside of blade supporting portion 48, turbine shell 42 includes an annular inner radial extension 50 that, at an inner radial end thereof, joins an axially extending inner circumferential section 52, whose inner circumferential surface contacts an outer circumferential surface of a hub bushing 54 having an L-shaped cross-section that is configured for contacting the outer circumferential surface of the transmission input shaft such that turbine 40 is rotatable with respect to the transmission input shaft.

Radially outside of blade supporting portion 48 and turbine blades turbine blades 46, an outer radial extension 56, which forms the engagement section of the turbine piston, radially protrudes outwardly from an outer circumference of blade supporting portion 48 to define an annular protrusion having a flat annular radially extending impeller facing surface 56a and having an outermost circumference that defines an outermost circumferential surface 56b of turbine 40. Accordingly, the piston and turbine shell 42 are formed as a single piece.

Impeller 39 includes impeller blades 58, which are each fixed at a transmission side thereof to impeller shell 38 and are each fixed to an impeller core ring 60 at an engine side thereof by tabs. Impeller shell 38, at radially extending section 36a of rear cover 36, includes a rounded blade supporting portion 62, which is shaped as an annular bowl, for contacting transmission side edges of impeller blades 58. Radially outside of blade supporting portion 62 and impeller blades 58, radially extending section 36a includes a radially extending wall 64, which forms the engagement section of impeller shell 38, radially protrudes outwardly from an outer circumference of rounded blade supporting portion 62 to define an annular wall having a flat annular radially extending turbine facing surface 64a. Radially outside of wall 64, rear cover 36 includes an axially extending section 36b positioned radially outside of turbine piston 40. Axially extending section 36b of rear cover 36 axially overlaps axially extending section 34c of front cover 34, with section 34c being radially inside of section 36b such that an inner circumferential surface of section 36b contacts an outer circumferential of section 34c. Rear cover 36 is welded to front cover 34 by a weld connecting a rim of section 36b with the outer circumferential surface of section 34c.

Radially inside of blade supporting portion 62, impeller shell 38 includes an annular inner radial extension 66 extending radially inward from blade supporting portion 62. A radially inner end of extension 66 is connected to an impeller hub 68. Torque converter 14 also includes a stator 70 axially between turbine 40 and impeller 39 to redirect fluid flowing from the turbine blades 46 before the fluid reaches impeller 39 to increase the efficiency of torque converter 14.

A friction material 72 is bonded onto radially extending impeller facing surface 56a of outer radial extension 56 for engaging radially extending wall 64. In other embodiments, instead of or in addition to being bonded to outer radial extension 56, friction material 72 may be bonded to radially extending turbine facing surface 64a of radially extending wall 64, or to one or more additional discs between radially extension 56 and wall 64. Regardless of whether friction material 72 is bonded to outer radial extension 56, radially extending wall 64 or one or more additional discs, friction material 72 is provided axially between surfaces 56a, 64a to selectively rotationally engage the engagement section of turbine piston 40 with the engagement section of impeller shell 38.

Torque converter 14 further includes a stepped flanged 74 fixed to inner radial extension 66 by a plurality of circumferentially spaced fasteners 76, which in this embodiment are rivets. Stepped flange 74 includes an outer radially extending section 74a defining an outermost circumference of flange 74, an intermediate axially extending section 74b extending axially from an inner radial end of outer section 74a toward front cover 34 and an inner radially extending section 74c extending radially inward from a front cover-side end of intermediate section 74b. Fasteners 76 pass through holes formed in outer section 74a and holes formed in inner radial extension 66. An inner circumferential surface of inner section 74c rests on an outer circumferential surface of a support hub 78, which includes a splined inner circumferential surface for non-rotatably connecting to an outer circumferential surface of the transmission input shaft. Flange 74 is non-rotatably connected to hub 78 by for example a weld 80 joining a rear cover side axially facing surface of inner section 74c to the outer circumferential surface of hub 78.

On a front cover side of flange 74, a bushing 82 is provided on the outer circumferential surface of hub 78. Bushing 82 has an L-shaped cross section and includes a cylindrical axially extending section 82a having an inner circumferential surface contacting the outer circumference of hub 78 and a disc-shaped radially extending section 82b, which extends radially outward from section 82a, having a rear cover-side radially extending surface contacting a front cover-side radially extending surface of inner section 74c of flange 74.

A coast engagement structure 84 is provided on an outer circumferential surface of axially extending section 82a. In this embodiment, the coast engagement structure 84 is in the form of a spring plate that is fixed to an inner radially extending surface 34d of radially extending section 34a of front cover 34. More specifically, spring plate 84 includes an inner radial end 84a that is supported on bushing 82 and an outer radial end 84b that is fixed to front cover 34 by a plurality of fasteners 86. In the embodiment shown in FIG. 1, fasteners 86 are extruded rivets formed by extruding respective portions of front cover 34 through holes formed in the radially outer end 84b of spring plate 84, and then stamping the free ends of the extruded portions to form rivet heads completing the rivets 86.

At radially inner end 84a, spring plate 84 has an L-shaped cross section that includes an axially extending section 84c defining an innermost circumference surface of spring plate 84 and a radially extending section 84d protruding radially outward from section 84c, with the inner circumferential surface of section 84c contacting the outer circumferential surface of section 82a of bushing 82 and the rear cover-side radially extending surface of section 84d contacting the front cover-side radially extending surface of section 82b of bushing. Between ends 84a, 84b, spring plate 84 includes an intermediate section that includes an inner tapered section 84e that axially tapers away from the radially outer end of section 84d toward front cover 34 while extending radially outward, a radially extending section 84f extending radially outward from the radially outer end of section 84e and an outer tapered section 84g that axially tapers away from the radially outer end of section 84f toward front cover 34 to join radially outer end 84b while extending radially outward. Sections 84e, 84f, 84g may be each provided with circumferentially spaced holes passing therethrough.

If turbine piston 40 moves too far away from impeller 39 during coast conditions, which occurs when turbine piston 40 rotates at a higher speed than impeller 39 and cover 32 about axis CA, then the flow restriction in the lockup clutch becomes too low to apply the lockup clutch. In order to preclude such low flow restriction, coast engagement structure 84 prevents turbine piston 40 from moving too far away from impeller 39 during coast conditions. In other words, coast engagement structure 84 is configured to limit movement of turbine piston 40 to constrain the lockup clutch liftoff such that a gap between the engagement section of the turbine piston 40 and the engagement section of impeller shell 38 is maintained within a predefined range.

The arrangement of flange 74, bushing 82 and spring plate 84 creates a stack path for the lockup clutch that is supported on cover 32, at a region that is not subject to ballooning deflection, so that under coasting conditions turbine piston 40 moves away from impeller 39 only within the predefined range thus enabling the flow restriction itself to apply the lockup clutch. In this case, in contrast to U.S. application Ser. No. 15/140,757, torque converter 14 does not include a damper assembly including ramps or any other features to axially push the turbine back to the impeller.

The coast thrust path of torque converter 14 starts from turbine 40 and goes into flange 74, bushing 82, spring plate 84 and then into front cover 34. In the case of the configuration shown in FIG. 1, the presence of the riveted rotor carrier 28 on front cover 34, with fasteners 30 being provided just radially outside of fasteners 86, for example by a distance of at least 4.5 mm, provides sufficient stiffness at the interface of front cover 34 and spring plate 84 to prevent ballooning at the location at which spring plate 84 is connected to front cover 34. Also, in order to compensate for the deflection of turbine 40 as well as vehicle control preferences, spring plate 84 is designed in the embodiment of FIG. 1 as a diaphragm spring, applying a very slight axial load pushing turbine 40 on impeller 39, thus biasing the lockup clutch into an engaged configuration.

Figure 2:
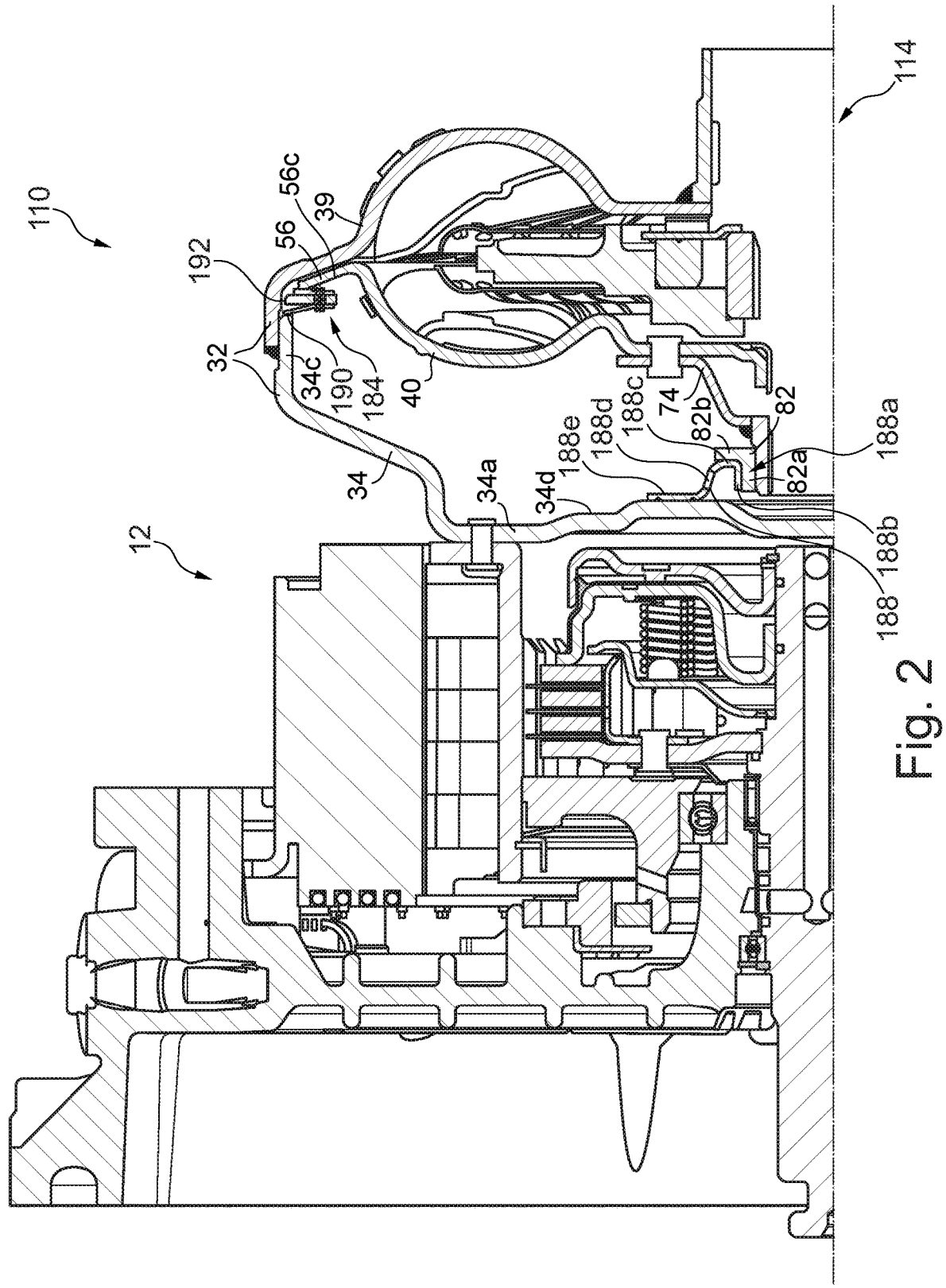
FIG. 2 shows a hybrid module in accordance with another embodiment of the present disclosure.

FIG. 2 shows a hybrid module 110 in accordance with another embodiment of the present disclosure. Module 110 includes hybrid drive unit 12 in the same manner as hybrid module 10, and a torque converter 114 configured in the same manner as torque converter 14, with the sole difference being that spring plate 84 is replaced by a centering sleeve 188 and the coast engagement structure is in the form of a ring assembly 184.

Centering sleeve 188, at radially inner end 188a includes an axially extending section 188b defining an innermost circumference surface of sleeve 188 and a radially extending section 188c protruding radially outward from section 188b, with the inner circumferential surface of section 188b contacting the outer circumferential surface of section 82a of bushing 82 and the rear cover-side radially extending surface of section 188c contacting the front cover-side radially extending surface of section 82b of bushing. At the radially outer end of section 188c, center sleeve includes an intermediate axially extending section 188d extending axially toward front cover 34, which merges into a radially extending outer section 188e that contacts inner radially extending surface 34d of radially extending section 34a of front cover 34. Centering sleeve 188 and bushing 82 do not axially thrust on hub 78 and are axially unconstrained.

Ring assembly 184 is configured for axially contacting a region of cover 32 that is no subject to ballooning deflection so that under coasting conditions turbine piston 40 moves away from impeller 39 only within the predefined range thus enabling the flow restriction itself to apply the lockup clutch. Ring assembly 184 extends circumferentially about center axis CA and contacts a rim 190 of axially extending section 34c of front cover 34.

Figure 3A:
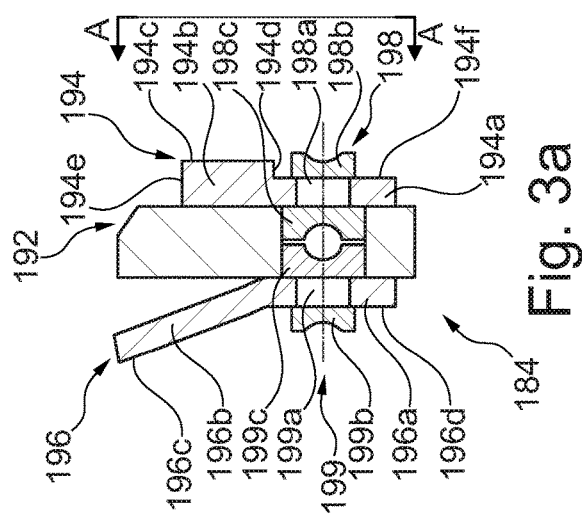
FIG. 3a shows an enlarged cross-sectional side view of a ring assembly of the hybrid module shown in FIG. 2.
Figure 3B:
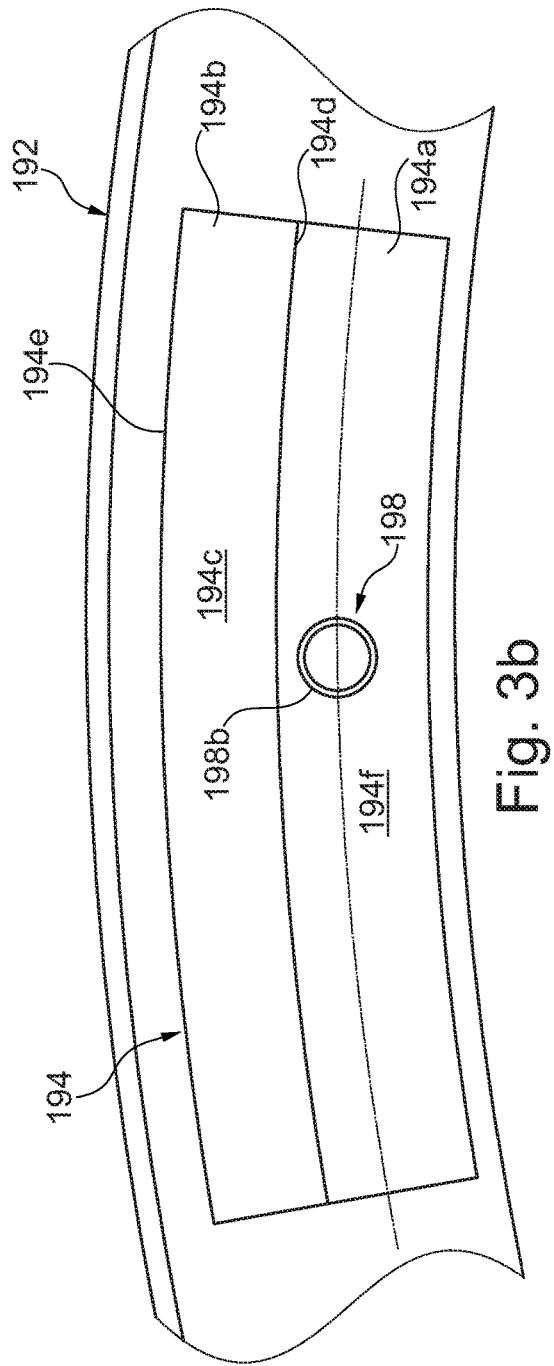

FIG. 3a shows an enlarged cross-sectional side view of ring assembly 184 and FIG. 3b shows a sectional view of ring assembly 184 along A-A in FIG. 3a. Ring assembly 184 includes a stamped ring 192 extending continuously around center axis CA (FIG. 1) and a plurality of circumferentially spaced powder metal bushings 194 fixed to a rear facing side of stamped ring 192. In an alternative embodiment, bushings 194 can be replaced by a continuous powder metal ring. Spring 196, which in this embodiment is formed by a plurality of circumferentially spaced spring segments, is fixed to front facing side of ring 192 to provide bias-on effect. The coast thrust path goes from turbine 40 into bushing 194, then ring 192, then segmented spring 196 and then reacts against cover 32 (FIG. 2).

Bushing segments 194 each include a base 194a for fixing the segment 194 to ring 192 and a contact section 194b configured for abutting front facing radially extending surface 56c of outer radial extension 56 (FIG. 2). Fasteners 198 fix bushing segments 194 to ring 192 by passing through base 194a. Contact section 194b is radially outward from and axially thicker than base 194a and includes a radially extending surface 194c, which extends from an inner circumferential surface 194d of section 194b to an outer circumferential surface 194e of section 194b, for contacting surface 56c of outer radial extension 56. Fasteners 198 may be in the form of extruded rivets that each include a shank 198a passing through base 194a, a head 198b contacting a radially extending rear facing surface 194f of base 194a and a base 198c provided inside of plate 192.

Spring segments 196 each include a base 196a for fixing the segment 196 to ring 192 and a biasing section 196b configured for abutting rim 190 of front cover 34 (FIG. 2). Biasing section 196b is axially flexible but resilient, such that biasing section 196b is bendable bent towards plate 192 by an axial force, but moves away from plate 192 after the axial force is removed or reduced. Fasteners 199 fix spring segments 196 to ring 192 by passing through base 196a. Biasing section 196b extends axially frontward from base 196a while extending radially outward, such that biasing section 196b extends at a nonperpendicular angle with respect to center axis CA (FIG. 2). A front facing radially and axially extending surface 196c of biasing section 196b contacts rim 190 of front cover 34. Fasteners 199 may be in the form of extruded rivets that include a shank 199a passing through base 196a, a head 199b contacting a radially extending front facing surface 196d of base 196a and a base 199c provided inside of plate 192.

Ring assembly 184 is provided axially between rim 190 and outer radial extension 56 such that biasing section 196b provides a biasing force on turbine 20. The biasing force is generated by the axial compression of biasing section 196b, by forcing biasing section 196b toward ring 192.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

LIST OF REFERENCE NUMERALS

CA center axis
10 hybrid module
12 hybrid drive unit
14 torque converter
16 electric motor
18 engine connect/disconnect clutch
20 input shaft
22 stator
24 rotor
24a magnet segments
26 housing
28 rotor carrier
28a cylindrical axially extending section
28b radially extending section
30 fasteners
32 cover
34 front cover
34a radially extending section
34b tapered section
34c axially extending section
34d inner radially extending surface
36 rear cover
36a radially extending section
36b axially extending section
38 impeller shell
40 turbine
42 turbine shell
44 turbine core ring
46 turbine blades
48 rounded blade supporting portion
50 inner radial extension
52 axially extending inner circumferential section
54 hub bushing
56 outer radial extension
56a flat annular radially extending impeller facing surface
56b outermost circumferential surface
58 impeller blades
60 impeller core ring
62 rounded blade supporting portion
64 radially extending wall
64a radially extending turbine facing surface
66 annular inner radial extension
68 impeller hub
70 stator
72 friction material
74 stepped flanged
74a outer radially extending section
74b intermediate axially extending section
74c inner radially extending section
76 fasteners
78 support hub
80 weld
82 bushing
82a cylindrical axially extending section
82b radially extending section
84 coast engagement structure—spring plate
84a inner radial end
84b outer radial end
84c axially extending section
84d radially extending section
84e inner tapered section
84f radially extending section
84g outer tapered section
86 fasteners—rivets
110 hybrid module
114 torque converter
184 coast engagement structure—ring assembly
188 centering sleeve
188a radially inner end
188b axially extending section
188c radially extending section
188d intermediate axially extending section
188e radially extending outer section
190 rim 192 stamped ring
194 bushing
194a base
194b contact section
194c radially extending surface
194d inner circumferential surface
194e outer circumferential surface
196 spring
196a base
196b head
196c axially extending surface
196d radially extending front facing surface
198 fasteners
198a shank
198b head
198c base
199 fasteners
199a shank
199b head
199c base

What is claimed is:

1. A torque converter comprising:
a cover;
an impeller including an impeller engagement section;
an axially movable turbine piston including a turbine engagement section configured for engaging the impeller engagement section to form a lockup clutch;
a spring configured for contacting the cover to limit axial movement of the turbine piston away from the impeller in a coast condition in which the turbine piston is rotating at a greater angular velocity than the impeller and the cover; and
at least one further part stacked in an axial direction between the spring and the turbine piston, the at least one further part configured for contacting the turbine piston in the coast condition,
wherein the spring contacts an axially extending section of the cover,
wherein the turbine piston includes a turbine shell supporting a plurality of turbine blades, the turbine shell including an outer radial extension radially outside of the turbine blades, the outer radial extension forming the engagement section of the turbine piston, the least one further part including a bushing fixed to the spring, the bushing arranged for contacting the outer radial extension during the coast condition.

2. The torque converter as recited in claim 1 wherein the spring contacts a non-ballooning portion of the cover.

3. The torque converter as recited in claim 1 wherein the spring is a spring plate and the cover includes a front cover and a rear cover forming a shell of the impeller, the front cover including an axially extending section welded to the rear cover and a radially extending section that is radially inward from the axially extending section, the spring plate being configured to contact the radially extending section of the front cover to limit axial movement of the turbine piston away from the impeller in the coast condition.

4. The torque converter as recited in claim 1 wherein the spring and the at least one further part form a ring assembly axially aligned with an outermost circumferential surface of the turbine piston.

5. The torque converter as recited in claim 4 wherein the cover includes a front cover and a rear cover fixed together, the axially extending section of the cover being part of the front cover, the spring configured to contact a rim of the axially extending section.

6. The torque converter as recited in claim 5 wherein the at least one further part includes a ring sandwiched axially between the bushing and the spring.

7. A torque converter comprising:
a cover;
an impeller including an impeller engagement section;
an axially movable turbine piston including a turbine engagement section configured for engaging the impeller engagement section to form a lockup clutch; and
a coast engagement structure configured for contacting the cover to limit axial movement of the turbine piston away from the impeller in a coast condition in which the turbine piston is rotating at a greater angular velocity than the impeller and the cover,
wherein the cover includes a front cover and a rear cover forming a shell of the impeller, the front cover including an axially extending section welded to the rear cover and a radially extending section radially inward from the axially extending section, the coast engagement structure including a spring plate configured to contact the radially extending section of the front cover to limit axial movement of the turbine piston away from the impeller in the coast condition, the radially extending section of the front cover intersecting a center axis of the torque converter which the turbine piston is designed to rotate around.

8. The torque converter as recited in claim 7 wherein the spring plate is fixed to the radially extending section of the front cover by a plurality of fasteners.

9. The torque converter as recited in claim 7 further comprising a flange fixed to the turbine piston, a hub configured for transferring torque to a transmission input shaft and a bushing provided on the hub and contacting the spring plate, the flange being non-rotatably fixed to the hub.

10. The torque converter as recited in claim 9 wherein a radially inner end of the coast engagement structure is supported on the hub via the bushing, the bushing being axially forced against the flange by the coast engagement structure during the coast condition.

11. A hybrid module comprising:
the torque converter as recited in claim 7; and
an electric motor fixed to the cover by a plurality of circumferentially spaced fasteners passing through the radially extending section of the front cover.

12. The hybrid module as recited in claim 11 wherein the electric motor includes a rotor and a rotor carrier supporting the rotor, the rotor carrier including an axially extending section supporting an inner circumferential surface of the rotor and a radially extending section extending radially outward from the axially extending section, the fasteners being fixed to the radially extending section of the rotor carrier, the coast engagement structure being fixed to the radially extending section of the front cover radially inside of the fasteners.

13. A method of constructing a torque converter comprising:
providing a cover, an impeller including an impeller engagement section and an axially movable turbine piston including a turbine engagement section configured for engaging the impeller engagement section to form a lockup clutch; and
arranging a spring in contact with the cover to limit axial movement of the turbine piston away from the impeller in a coast condition in which the turbine piston is rotating at a greater angular velocity than the impeller and the cover; and providing at least one further part stacked in an axial direction between the spring and the turbine piston, the at least one further part configured for contacting the turbine piston in the coast condition, wherein the spring contacts an axially extending section of the cover, wherein the turbine piston includes a turbine shell supporting a plurality of turbine blades, the turbine shell including an outer radial extension radially outside of the turbine blades, the outer radial extension forming the engagement section of the turbine piston, the least one further part including a bushing fixed to the spring, the bushing arranged for contacting the outer radial extension during the coast condition.

14. The method as recited in claim 13 wherein the spring is arranged in contact with a non-ballooning portion of the cover.

15. The method as recited in claim 13 wherein the spring and the at least one further part form a ring assembly, the arranging the coast engagement structure includes axially aligning the ring assembly with an outermost circumferential surface of the turbine piston.

\* \* \* \* \*